United States Patent
Meis et al.

(10) Patent No.: US 10,776,634 B2
(45) Date of Patent: Sep. 15, 2020

(54) METHOD FOR DETERMINING THE COURSE OF THE ROAD FOR A MOTOR VEHICLE

(75) Inventors: Urban Meis, Lindau (DE); Christoph Wiedemann, Wasserburg (DE); Wladimir Klein, Lindau (DE); Christoph Brüggemann, Jena (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 1035 days.

(21) Appl. No.: 13/641,748

(22) PCT Filed: Mar. 31, 2011

(86) PCT No.: PCT/DE2011/000359
§ 371 (c)(1),
(2), (4) Date: Jan. 24, 2013

(87) PCT Pub. No.: WO2011/131165
PCT Pub. Date: Oct. 27, 2011

(65) Prior Publication Data
US 2013/0173232 A1 Jul. 4, 2013

(30) Foreign Application Priority Data

Apr. 20, 2010 (EP) .................................... 10401058
May 19, 2010 (DE) ....................... 10 2010 020 984

(51) Int. Cl.
*G08G 1/16* (2006.01)
*G06K 9/78* (2006.01)
*G06K 9/00* (2006.01)

(52) U.S. Cl.
CPC ......... *G06K 9/00798* (2013.01); *G08G 1/167* (2013.01); *G08G 1/16* (2013.01)

(58) Field of Classification Search
CPC ........ G06T 2207/30256; G06T 7/0083; G05D 2201/0213; B60W 30/12; B60W 30/095;
(Continued)

(56) References Cited

U.S. PATENT DOCUMENTS 5,245,422 A * 9/1993 Borcherts ............ G05D 1/0246
348/119
5,612,883 A * 3/1997 Shaffer ................ G05D 1/0272
701/300

(Continued)

FOREIGN PATENT DOCUMENTS

DE           101 38 641 A1      2/2003
DE      10 2005 058 809 A1      6/2007
(Continued)

OTHER PUBLICATIONS

Y. Wang, et al, "Lane Detection Using Spline Model," Pattern Recognition Letters, vol. 21, 2000, pp. 677-689.*
(Continued)

Primary Examiner — Jay Hann
(74) Attorney, Agent, or Firm — W. F. Fasse

(57) ABSTRACT

A method for determining the course of the road for a moving motor vehicle having a surroundings sensor system. Sensor data generated by the surroundings sensor system are evaluated to detect lane-relevant features. A lane model having at least one lane model parameter that determines the course of the lane is generated for the road, structures of at least one distance range that are parallel to the road are detected in the sensor data, the tangential direction of at least the one structure that is parallel to the road is determined, and the value of the tangential direction of the structure that is parallel to the road is adopted as the value of the direction of the tangent line at the point of contact with the structure (Continued)

that is parallel to the road to determine at least the one lane model parameter by predictive estimation in the lane model.

24 Claims, 1 Drawing Sheet

(58) Field of Classification Search
CPC .. B62D 15/025; B62D 15/0265; B62D 15/28; G06K 9/00798; G08G 1/16; G08G 1/167; B60T 2201/08; B60T 8/17557
See application file for complete search history.

(56) References Cited

U.S. PATENT DOCUMENTS

| | | | | |
|---|---|---|---|---|
| 5,638,116 | A * | 6/1997 | Shimoura | G06K 9/00798 348/118 |
| 5,922,036 | A * | 7/1999 | Yasui | G06K 9/00798 701/301 |
| 6,205,234 | B1 * | 3/2001 | Kakinami | G06T 7/0083 382/104 |
| 6,718,259 | B1 * | 4/2004 | Khosla | G08G 1/167 701/468 |
| 6,751,547 | B2 * | 6/2004 | Khosla | G01C 21/26 701/523 |
| 6,807,287 | B1 * | 10/2004 | Hermans | G06T 7/0042 348/118 |
| 6,819,779 | B1 * | 11/2004 | Nichani | G06K 9/00798 382/104 |
| 6,823,241 | B2 | 11/2004 | Shirato et al. | |
| 7,477,988 | B2 | 1/2009 | Dorum | |
| 8,391,556 | B2 * | 3/2013 | Kuehnle | G06K 9/00798 382/104 |
| 8,457,359 | B2 * | 6/2013 | Strauss | B60R 21/0134 382/104 |
| 8,629,784 | B2 * | 1/2014 | Szczerba | G01S 13/723 340/438 |
| 8,775,063 | B2 * | 7/2014 | Zeng | B60W 40/072 342/107 |
| 9,090,263 | B2 * | 7/2015 | Zeng | B60W 40/06 |
| 9,171,217 | B2 * | 10/2015 | Pawlicki | B60W 30/18 |
| 2002/0042668 | A1 * | 4/2002 | Shirato | G06K 9/00798 701/1 |
| 2002/0042676 | A1 | 4/2002 | Furusho | |
| 2002/0131620 | A1 * | 9/2002 | Shirato | G06K 9/00798 382/104 |
| 2002/0134151 | A1 * | 9/2002 | Naruoka | G01S 11/12 73/291 |
| 2004/0240710 | A1 | 12/2004 | Lages et al. | |
| 2005/0190975 | A1 * | 9/2005 | Porikli | G06K 9/00711 382/235 |
| 2005/0225477 | A1 * | 10/2005 | Cong | B60K 31/0008 342/70 |
| 2006/0220912 | A1 * | 10/2006 | Heenan | G05D 1/0248 340/933 |
| 2006/0239509 | A1 * | 10/2006 | Saito | G06K 9/00798 382/104 |
| 2008/0061952 | A1 * | 3/2008 | Maass | B60Q 9/008 340/435 |
| 2008/0255728 | A1 | 10/2008 | Ottenhues et al. | |
| 2008/0273750 | A1 * | 11/2008 | Fujimoto | G06K 9/00362 382/103 |
| 2008/0291276 | A1 * | 11/2008 | Randler | B62D 1/28 348/149 |
| 2009/0067675 | A1 * | 3/2009 | Tan | G06K 9/00798 382/104 |
| 2010/0253540 | A1 * | 10/2010 | Seder | B60R 1/00 340/905 |
| 2010/0253598 | A1 * | 10/2010 | Szczerba | G01S 13/723 345/7 |
| 2010/0329513 | A1 | 12/2010 | Klefenz | |
| 2012/0185167 | A1 * | 7/2012 | Higuchi | G01C 21/3602 701/461 |

FOREIGN PATENT DOCUMENTS

| | | |
|---|---|---|
| DE | 10 2006 040 333 A1 | 3/2008 |
| DE | 10 2006 062 061 A1 | 7/2008 |
| EP | 1 684 142 A1 | 7/2006 |
| JP | 03139706 | 6/1991 |
| JP | 11160078 | 6/1999 |
| JP | 200036037 | 2/2000 |
| JP | 2002175535 | 6/2002 |
| JP | 2007264717 | 10/2007 |
| JP | 2007316654 | 12/2007 |
| JP | 2008059323 | 3/2008 |
| JP | 2009193507 | 8/2009 |
| WO | WO 03/015053 A1 | 2/2003 |

OTHER PUBLICATIONS

J. Miller "Curves In The Plane, Derivative Of Arc Length, Curvature, Radius Of Curvature, Circle Of Curvature, Evolute," on the Web at http://www.solitaryroad.com/c327.html, date given by Wayback Archive as Mar. 28, 2010, 4 pages.*
Lim, K., et al. "Lane Detection and Kalman-based Linear-Parabolic Lane Tracking" IEEE Int'l Conf. on Intelligent Human-Machine Systems & Cybernetics, pp. 351-354 (2009) (Year: 2009).*
Takahashi, A. & Ninomiya, Y. "Model-Based Lane Recognition" IEEE Intelligent Vehicles Symposium (1996) (Year: 1996).*
McCall, J. & Trivedi, M. "Video-Based Lane Estimation and Tracking for Driver Assistance: Survey, System, and Evaluation" IEEE Transactions on Intelligent Transportation Systems, vol. 7, No. 1 (2006) (Year: 2006).*
Liatis, P., et al. "A Novel Lane Support Framework For Vision-Based Vehicle Guidance" IEEE Int'l Conf. on Industrial Tech. (2003) (Year: 2003).*
Assidiq, A., et al. "Real Time Lane Detection for Autonomous Vehicles" Proceedings of Int'l Conf. on Computer & Communication Engineering, pp. 82-88 (2008) (Year: 2008).*
Aly, Mohamed "Real time Detection of Lane Markers in Urban Streets" IEEE Intelligent Vehicles Symposium, pp. 7-12 (2008) (Year: 2008).*
Tseng, C., et al. "A Lane Detection Algorithm Using Geometry Information and Modified Hough Transform" 18th IPPR Conf. on Computer Vision Graphics & Image Processing, pp. 796-802 (2005) (Year: 2005).*
Khosla, D. "Adaptive Kalman Filter Approach for Road Geometry Estimation" IEEE Int'l Conf. on Intelligent Transportation Systems, pp. 1145-1151 (2003) available from <https://ieeexplore.ieee.org/abstract/document/1252664> (Year: 2003).*
Corridori, C. & Zanin, M. "High Curvature Two-Clothoid Road Model Estimation" IEEE Int'l Conf. on Intelligent Transportation Systems, pp. 630-635 (2004) (Year: 2004).*
Nieto, M., et al. "Stabilization of Inverse Perspective Mapping Images based on Robust Vanishing Point Estimation" IEEE Intelligent Vehicle Symposium, pp. 315-320 (2007) (Year: 2007).*
Zhou et al., "A robust lane detection and tracking method based on computer vision," Measurement Science and Techology, vol. 17 (2006) pp. 736-745.
Lai et al., "Lane Detection by Qrientation and Length Discrimination," IEEE Transactions on Systems, Man and Cybernetics-Part B: Cybernetics, vol. 30, No. 4, Aug. 2000, pp. 539-547.
Meis et al., "A New Method for Robust Far-distance Road Course Examination in Advanced Driver Assistance Systems," 2010 13$^{th}$ International IEEE Annual Conference on Intelligent Transportation Systems, Madeira Island, Portugal, Spain 19-22, 2010, pp. 1357-1361.
International Search Report for PCT Application No. PCT/DE2011/000359 dated Aug. 8, 2011.
Japanese Office Action dated Sep. 2, 2015 for Japanese Application No. 2013-505331, including English translation.
Japanese Office Action dated May 11, 2016 for Japanese Application No. 2013-505331, including English translation.
German Search Report for German Patent Application DE 10 2010 020 984.8, dated Dec. 29, 2010, German Patent and Trademark Office, 3 pages, with English translation, 3 pages.

(56) References Cited

OTHER PUBLICATIONS

Meis et al., "A New Method for Robust Far-distance Road Course Estimation in Advanced Driver Assistance Systems", 2010 13$^{th}$ International IEEE Annual Conference on Intelligent Transportation Systems, Madeira Island, Portugal, Sep. 19-22, 2010, pp. 1357-1361.

Zhou et al., "A robust lane detection and tracking method based on computer vision", Measurement Science and Technology, vol. 17, (Feb. 21, 2006), pp. 736-745.

Lai et al., "Lane Detection by Orientation and Length Discrimination", IEEE Transactions on Systems, Man and Cybernetics-Part B: Cybernetics, vol. 30, No. 4, Aug. 2000, pp. 539-548.

\* cited by examiner

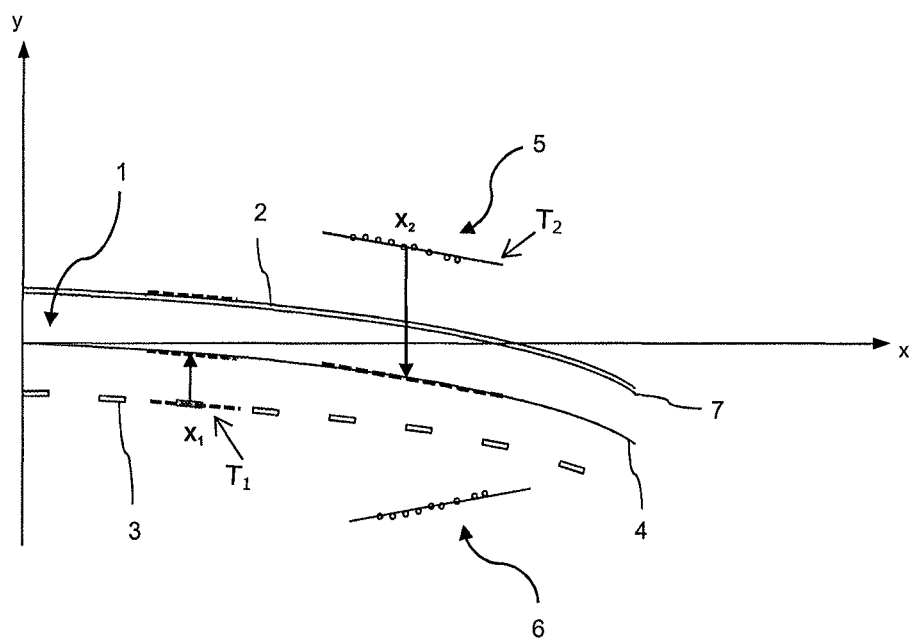

METHOD FOR DETERMINING THE COURSE OF THE ROAD FOR A MOTOR VEHICLE

CROSS REFERENCE TO RELATED APPLICATIONS

This application is the U.S. National Phase Application of PCT/DE2011/000359, filed Mar. 31, 2011, which claims priority to European Patent Application No. 10401058.2, filed Apr. 20, 2010 and German Patent Application No. 10 2010 020 984.8, filed May 19, 2010, the contents of such applications being incorporated by reference herein.

FIELD OF THE INVENTION

The invention relates to a method for determining the course of a road or a lane of the road for a moving motor vehicle with at least one surroundings sensor system directed toward the road, wherein the sensor data generated by the surroundings sensor system are evaluated to detect lane-relevant features. Furthermore, the invention relates to a motor vehicle with a device for carrying out the inventive method.

BACKGROUND OF THE INVENTION

Lane detection is an important component of driver assistance systems that are used, e.g., for longitudinal control or for lane keeping.

Known lane detection systems are based on assigning the detected structures to the side of the lane and the distance thereof from the middle of the lane. The difficulty of said assignment increases with an increasing distance of the measuring system from the structures. Furthermore, the description of the detected lane usually refers to the position of the vehicle and does not provide any explicit information about the far range. The usual lane model uses the curvature and the curvature change of a clothoid model to describe the further course of the road, wherein the estimated values are an averaging relative to the ego-position of the vehicle. Therefore, the known methods are not capable of determining the exact point of transition between two clothoid segments since roads are created by stringing clothoid segments together. For example, the transition from a bend to a straight line cannot be determined precisely, which results in an unnatural control behavior of a vehicle lateral control system of a driver assistance system at these points of transition.

According to U.S. Pat. No. 6,718,259 B1, which is incorporated by reference, this problem is solved by supplying the surroundings data generated by a sensor system to a filter bank made up of several Kalman filters, wherein the lane model is based on a clothoid model in which the road region in front of the vehicle is subdivided into a near range (up to a distance d1) and a far range (distance from d1 to d2) having different clothoid parameters, wherein a continuous transition between these two ranges is assumed. Thus, a point of transition between two clothoid segments of the road is not estimated, but the transition point is assumed to be at distance d1. Each of the individual Kalman filters of the filter bank is adapted to a lane model, which lane models differ from each other with respect to the position of the transition point relative to distance d1. Each Kalman filter of this filter bank provides an estimate of the lane model parameters of the respective model, wherein each of these estimated values is subsequently weighted with a weighting value that corresponds to the probability of the occurrence of the respective model. The weighted output data are merged.

SUMMARY OF THE INVENTION

The disadvantage of this known method according to U.S. Pat. No. 6,718,259 B1 consists in the high complexity of the filter bank made up of Kalman filters and results in long runtimes. The transition point is not detected but filtered out so that the model error remains present.

An aspect of the invention provides a method of the type mentioned at the beginning that is improved as against the known method and that can detect the transition points of the course of the curvature of the road and thus correctly model the course of the lane right into the far range.

According to an aspect of the invention, a method for determining the course of the road for a moving motor vehicle with at least one surroundings sensor system in which the sensor data generated by the surroundings sensor system that is directed toward the road are evaluated in order to detect lane-relevant features is characterized in that a lane model having at least one lane model parameter that determines the course of the lane is generated for the road, structures of at least one distance range that are parallel to the road are detected in the sensor data, the tangential direction of at least the one structure that is parallel to the road is determined, and in order to determine the at least one lane model parameter by a predictive estimation method, the value of the tangential direction of the structure that is parallel to the road is adopted as the value of the tangent direction of the middle of the lane in the lane model at the distance of the point of contact with the structure that is parallel to the road.

According to this inventive method, all structures that are parallel to the road, such as lane markings, curbstones, structures on the roadside, crash barriers and the like, are used to estimate the course of the lane without having to additionally introduce filtering quantities for the estimation method. Furthermore, this inventive method is not dependent on the lateral distance of the structures that are parallel to the road nor is it necessary to estimate a deviation from the middle of the lane for the motor vehicle so that the number of the degrees of freedom is small which results in an estimation method that is more robust, more efficient with respect to runtime and less error-prone. Thus, the course of the lane can be modeled over the entire considered distance range by means of a lane model with extremely precise estimated values, wherein all lane models that result in continuously differentiable functions are suitable. Such lane models include, aside from a clothoid road model, the circular-arc model, the double-clothoid model and the spline model, for example.

Furthermore, the inventive method is also not dependent on the type of the surroundings sensor system used. Thus, an image-based sensor (e.g., a camera) as well as a radar sensor, a lidar sensor or a digital map with GPS within a navigation system or a combination thereof may be used.

Finally, the inventive method can also be used to predict lane-related system limits that can be advantageously used in driver assistance systems. For example, a narrowing or tightening bend in an approach road can be detected in advance so that a driver assistance system can prepare the driver of the vehicle for a system transfer or indicate a bend radius located 60 m ahead of the vehicle or a minimal bend radius.

According to an advantageous further development of the invention, structures that are parallel to the road are determined from the sensor data by means of an edge detection method by determining and evaluating gray-scale gradients. To this end, a Hough transform is preferably used, by means of which shapes, e.g., straight lines or circles made up of edge points, can be detected. In order to preclude or exclude incorrect or false structures, a criterion of parallelism is advantageously introduced, by means of which criterion it is possible to detect structures that are parallel to the road and that are located on both sides of the road at the same distance ahead or in front of the motor vehicle, and to preclude or exclude non-parallel structures.

Furthermore, according to an advantageous realization of the invention, the predictive estimation of the lane model parameter is performed by means of a Kalman filter model that is approximated, e.g., by means of a third-order polynomial known in the art. Of course, estimation methods that are comparable with the Kalman filter model may be used as well.

Finally, according to a further development of the invention, the advantageous properties of the inventive method are shown by the fact that the lane width of the road, the deviation of the motor vehicle from the middle of the lane and the yaw angle of the motor vehicle are determined from the sensor data that cover the near range of the road and the further course of the lane is determined by means of the at least one generated lane model parameter.

This shows that the inventive method results in a reduction of the state space because the inventive method is not dependent on the lane width or on the deviation of the vehicle from the middle of the lane, whereby the method is made more robust and more efficient with respect to runtime. This partitioning of the state space into a near range and a far range prevents changes of the width of the lane, e.g., lane widening or exit ramps, from negatively influencing the lane model parameters. The lane width and the deviation of the vehicle from the middle of the lane can be restricted to the relevant near range and do not have to be estimated and averaged for the entire measuring range.

The inventive method can be advantageously used in a vehicle having a driver assistance system, e.g., within a longitudinal control system (e.g. a spacing distance regulation system), a lane keeping system or a lane departure warning system.

BRIEF DESCRIPTION OF THE DRAWINGS

In the following, the invention will be explained in greater detail with reference to the single attached FIG. 1 that shows structures that are parallel to the road and structures that are not parallel to the road in order to explain the inventive method, which structures are shown in a road coordinate system of a road.

DETAILED DESCRIPTION

A surroundings sensor system that may be a camera, a radar or lidar sensor as well as a digital map with GPS (e.g., within a navigation system) provides sensor data for an evaluation unit by means of which the inventive method is carried out.

Said sensor data are used to carry out a feature extraction by the detection of structures that are parallel to the road, such as crash barriers, verges, lane markings, curbstones or other demarcating structures that are parallel to the road.

For example, an edge detection method is used to this end during video processing, by means of which method the contours of such structures that are parallel to the road can be detected, wherein an edge is regarded as a change of the gray-scale values, i.e., the gray-scale gradients are determined and evaluated by means of a Hough transform.

To this end, the sensor data are subdivided into search areas having surroundings-related horizontal and vertical boundaries, wherein the lane detected in the near range is used for the vertical boundaries.

A clothoid model having clothoid segments is used as a lane model. Each clothoid segment is described by an initial curvature $c_0$ and a curvature change $c_1$ and approximated in the x-y coordinate system of the road by means of a third-order polynomial:

$$l(x) = y = \frac{c_0}{2}x^2 + \frac{c_1}{6}x^3$$

From the sensor data, an edge image is extracted that corresponds to the structure that extends tangentially to the middle of the lane. Furthermore, said edge image has a slope m as a tangent line at a point in front of the vehicle. Said slope m is determined by means of a Hough transform.

The slope m of said tangent line is adopted as the value of the tangent direction of the middle of the lane in the lane model at the distance of the point of contact with the structure that is parallel to the road and that represents the tangent line.

Such a situation is shown in FIG. 1 that is shown in the coordinate system of the road. The road is shown as a two-lane road with a lane 1 that is demarcated by a verge or edge boundary 2 and a center line 3. The middle 4 of the lane 1 extends through the origin of coordinates and tangentially to the x-axis. The verge or edge boundary 2 is represented by a clothoid segment. The end of said clothoid segment is denoted by reference numeral 7 that may also represent a point of transition to the next road segment.

Said FIG. 1 shows, in position $x_1$, an individual center line 3 as a structure that is parallel to the road, which structure was extracted from image data of a road scene that was recorded by means of a camera. A tangent line T1 with a slope $m_1$ that extends parallel to the middle of the lane (indicated by an arrow) is determined in the centroid of said individual center line 3.

Furthermore, FIG. 1 shows, in position $x_2$, a further structure 5 that is parallel to the road, which structure 5 consists of several objects that are arranged in a straight line and detected as stationary radar targets by means of, e.g., a radar sensor. In the centroid of said structure, a tangent line T2 with a slope $m_2$ extends parallel to the middle of the lane 4 (indicated by an arrow).

Finally, FIG. 1 shows a further straight-line structure 6 at the edge or side of the road. However, said structure 6 does not extend parallel to the road.

The sensor-data-based measurement of the slopes $m_i$ and of the associated positions $x_1$ is used to estimate the lane model parameters $c_0$ and $c_1$ of the clothoid model by means of a Kalman filter that has the following form in the $x_i$-$y_i$ coordinate system of the vehicle in the above-mentioned approximation:

$$l(x_i) = y_i = y_{0L/R} + \theta x_i + \frac{c_0}{2}x_i^2 + \frac{c_1}{6}x_i^3,$$

wherein $y_{OLIR}$ is the deviation (offset) of the vehicle from the middle of the lane to the left or to the right and $\theta$ is the yaw angle of the vehicle.

The associated measurement equation in the Kalman filter model is obtained by differentiating the above equation $l(x_i)$ and equating with the slope $m_i$:

$$m_i = \theta + c_0 x_i + \frac{c_1}{2} x_i^2.$$

By means of this measurement equation, the estimated lane model parameters $c_0$ and $c_1$ are corrected in order to determine the further course of the lane (represented by dashed lines in FIG. 1). Thus, the course of the lane can be modeled over the entire considered distance range, in particular over the far range.

Aside from the single-clothoid model described herein, a double-clothoid model or a node-based spline model may be used as a lane model.

It is also possible to determine the curvature $c_0$ in the considered distance segment by means of the slope m prior to estimating the lane model parameters $c_0$ and $c_1$. To this end, the course of the lane is approximated in each distance segment by the parabola $$l(x) = \frac{c_0}{2} x^2,$$

wherein $c_0$ is the curvature in the x-position. The slope m of detected structures that are parallel to the road (which slope m is determined from the sensor data) corresponds to the slope of the parabola in the same x-position and is given by the first derivative, i.e., $c_0$ x=m, so that the curvature $c_0$ is:

$$c_0 = \frac{m}{x}.$$

In order to preclude or exclude incorrect or false structures (i.e., structures that are not parallel to the road), a two-dimensional Hough method may be used to search the detected distance range for pairs of straight lines that extend parallel to each other on opposite sides of the road. By means of such a criterion of parallelism, straight lines like the roadside structures 6 shown in FIG. 1 can be precluded or excluded from the evaluation.

In the inventive method described herein, the detection of structures that are parallel to the road does not require any knowledge of the lateral distance of said structures, whereby it is not necessary to estimate the lateral offset of the vehicle, either.

The parameters $y_{OLIR}$ (distance or offset of the vehicle from the middle of the lane) to be determined in the near range and the lane width can be determined by means of individual measurements, which results in an advantageous partitioning of the state space with the offset and the lane width from the near range and the lane model parameters $c_0$ and $c_1$ in the far range. The yaw angle $\theta$ is also determined in the near-range partition. Such a partitioning of the state space prevents changes of the width of the lane, e.g., lane widening or exit ramps, from negatively influencing the lane model parameters, i.e., it is not dependent thereon and thus causes the degrees of freedom to be reduced, whereby the filter system (the Kalman filter in this exemplary embodiment) is made more robust, i.e., less error-prone, and more efficient with respect to runtime and results in more precise estimated values.

Since the course of the lane detected in the near range is extrapolated into the far range by means of the inventive method, it is not necessary to average and estimate the offset and the lane width in the far range.

In order to preclude or exclude incorrect or false straight-line roadside structures (shown in FIG. 1) whose straight lines do not extend parallel to the road in the centroid, a criterion of parallelism is used, as described above, when evaluating the sensor data. According to said criterion, only structures that are parallel to each other and that extend in the same position ahead of the vehicle respectively to the left and to the right of the lane are determined as road-parallel structures, for example.

Each individual measurement (tangent line) can be converted into a piece of curvature information in the x-position. If one looks at the individual tangent measurements sequentially in the x-direction, the measurements exhibit a deviation from the filtered lane model beginning from clothoid transition point 7 onward in the x-direction of FIG. 1, whereby said transition point 7 can be determined. Thus, a lateral vehicle control that corresponds to the natural driving behavior can be performed within a driver assistance system.

Within a driver assistance system, it is also possible to predict the reaching of lane-related system limits. For example, a narrowing i.e. tightening bend in an approach road can be detected in advance so that a driver assistance system can prepare the driver of the vehicle for a system transfer or indicate a bend radius located 60 m ahead of the vehicle or a minimal bend radius.

The inventive method demonstrates that the additional use of structures that are parallel to the road (such as markings, curbstones, structures on the roadside, and crash barriers i.e. guardrails) for the predictive determination of bend radii is possible without having to extend the filters.

The invention claimed is:

1. A method of determining a course of a driving lane along a road ahead of a vehicle that is driving on the driving lane, comprising steps:
   a) providing a lane model, which models the driving lane, and which includes at least one lane course parameter that models the course of the driving lane;
   b) with at least one sensor system of the vehicle, acquiring sensor data regarding surroundings ahead of the vehicle;
   c) evaluating at least a portion of the sensor data, comprising:
      detecting, from the sensor data, plural candidate structures in the surroundings ahead of the vehicle,
      for each respective one of the candidate structures, determining a respective tangent line that is a straight line tangent to the respective candidate structure at a selected point thereon, and
      among the plural candidate structures, selecting a pair of structures of which the respective tangent lines are parallel to one another;
   d) determining an orientation value of the tangent lines of the pair of structures;
   e) determining a respective updated value of the at least one lane course parameter and updating the lane model with the respective updated value by adopting the determined orientation value of the tangent lines of the pair of structures as a predicted orientation value of the course of the lane at a point at a first distance in an x-direction ahead of the vehicle; and f) using the lane model with the respective updated value of the at least one lane course parameter to predictively determine the course of the driving lane, and operating a driver assistance system of the vehicle dependent thereon and in response thereto, to assist in a driving operation of the vehicle;

wherein the steps d) and e) are performed without use of a lateral distance, transversely to the x-direction, of the pair of structures from the course of the driving lane.

2. A method of determining a course of a lane of a road, on which lane a motor vehicle is driving, wherein the motor vehicle has at least one surroundings sensor system directed toward the road, wherein sensor data generated by the surroundings sensor system are evaluated to detect a plurality of lane-relevant features, the method comprising:
generating a lane model having at least one lane model parameter that determines the course of the lane;
acquiring the sensor data with the surroundings sensor system;
partitioning the sensor data into a near range and a far range relative to the vehicle;
in the near range of the sensor data and not in the far range of the sensor data, determining a lane width of the lane of the road, a deviation of the motor vehicle from a middle of the lane, and a yaw angle of the motor vehicle;
in the sensor data, detecting a plurality of structures that are parallel to the road, the detecting including:
determining whether a detected first structure is parallel to any detected second structure among the plurality of structures at a same distance ahead of the motor vehicle; and
precluding the detected first structure from the plurality of structures if the detected first structure is not parallel to any detected second structure at the same distance ahead of the motor vehicle;
determining, as a value of a slope of a tangent, a tangential direction of at least one of the plurality of structures that is not precluded and that is parallel to the road;
using the value of the slope of the tangent of the at least one of the plurality of structures, and not using a lateral distance for each of the at least one of the plurality of structures in a lateral direction of the motor vehicle, to calculate the at least one lane model parameter in the lane model by a predictive estimation, wherein the at least one lane model parameter represents a curvature of the lane at a distance of the at least one of the plurality of structures; and
using the lane model having the lane width of the lane of the road, the deviation of the motor vehicle from the middle of the lane, the yaw angle of the motor vehicle, and the at least one lane model parameter, in a driver assistance system of the motor vehicle to assist a driver of the motor vehicle.

3. A vehicle with a driver assistance system, configured to carry out a method of determining a course of a lane of a road, on which lane the motor vehicle is driving, wherein the motor vehicle has at least one surroundings sensor system directed toward the road, wherein the surroundings sensor system is configured to generate sensor data, the driver assistance system is configured to evaluate the sensor data to detect a plurality of lane-relevant features, and the driver assistance system is configured:

to generate a lane model having at least one lane model parameter that determines the course of the lane;
to acquire the sensor data with the surroundings sensor system;
to partition the sensor data into a near range and a far range relative to the vehicle;
in the near range of the sensor data and not in the far range of the sensor data, to determine a lane width of the lane of the road, a deviation of the motor vehicle from a middle of the lane, and a yaw angle of the motor vehicle;
in the sensor data, to detect a plurality of structures that are parallel to the road, by:
determining whether a detected first structure is parallel to any detected second structure among the plurality of structures at a same distance ahead of the motor vehicle; and
precluding the detected first structure from the plurality of structures if the detected first structure is not parallel to any detected second structure at the same distance ahead of the motor vehicle;
to determine, as a value of a slope of a tangent, a tangential direction of at least one of the plurality of structures that is not precluded and that is parallel to the road;
to use the value of the slope of the tangent of the at least one of the plurality of structures, and not use a lateral distance for each of the at least one of the plurality of structures in a lateral direction of the motor vehicle, to calculate the at least one lane model parameter in the lane model by a predictive estimation, wherein the at least one lane model parameter represents a curvature of the lane at a distance of the at least one of the plurality of structures; and
to use the lane model having the lane width of the lane of the road, the deviation of the motor vehicle from the middle of the lane, the yaw angle of the motor vehicle, and the at least one lane model parameter, in the driver assistance system to assist a driver of the motor vehicle.

4. A method of determining a course of a driving lane along a road ahead of a vehicle that is driving on the driving lane, comprising steps:

a) providing a lane model, which models the driving lane, and which includes at least one lane course parameter that models the course of the driving lane, wherein the lane model includes and is partitioned into a near range lane model and a far range lane model;

b) with at least one sensor system of the vehicle, acquiring sensor data regarding surroundings ahead of the vehicle, wherein the sensor data includes and is partitioned into near range sensor data regarding a near range of the surroundings ahead of the vehicle and far range sensor data regarding a far range of the surroundings ahead of the vehicle, wherein the far range is located farther ahead of the vehicle than the near range;

c) evaluating at least the far range sensor data, comprising:
detecting, from the far range sensor data, plural candidate structures in the far range of the surroundings ahead of the vehicle,
for each respective one of the candidate structures, determining a respective tangent line that is a straight line tangent to the respective candidate structure at a selected point thereon, and
among the plural candidate structures, selecting a pair of structures of which the respective tangent lines are parallel to one another;

d) determining an orientation of the tangent lines of the pair of structures;

e) determining a respective updated value of the at least one lane course parameter and updating the far range lane model with the respective updated value only for the far range based on using the determined orientation of the tangent lines of the pair of structures as a predicted orientation of the course of the lane in the far range at a point at a first distance in an x-direction ahead of the vehicle;

f) evaluating only the near range sensor data to determine therefrom actual detected parameters for the near range including a lane width of the driving lane, a lateral deviation of the vehicle from a virtual center line of the driving lane, and a yaw angle of the vehicle in the near range;

g) generating and updating the near range lane model based only on the actual detected parameters for the near range; and h) using the lane model with the respective updated value of the at least one lane course parameter to predictively determine the course of the driving lane, and operating a driver assistance system of the vehicle dependent thereon and in response thereto, to assist in a driving operation of the vehicle.

5. The method according to claim 4, wherein the step d) comprises determining a slope value of the tangent lines relative to the x-direction as the orientation of the tangent lines.

6. The method according to claim 4, wherein, in the step e), the point at the first distance ahead of the vehicle in the x-direction is a point on a virtual center line of the lane as modeled by the lane model.

7. The method according to claim 4, wherein, in the step e), the updating of the lane model comprises determining a new function that defines the course of the lane for a next segment of the lane model extending farther ahead of the vehicle in the x-direction beyond the first distance, based on the predicted orientation.

8. The method according to claim 4, wherein the pair of structures includes at least one physical structure that extends above a level of the road, selected from the group consisting of curbstones, crash barriers, guardrails, and roadside structures.

9. The method according to claim 4, wherein the at least one sensor system of the vehicle includes a radar sensor and/or a lidar sensor, and the sensor data that is evaluated in the step c) respectively includes radar data produced by the radar sensor and/or lidar data produced by the lidar sensor.

10. The method according to claim 4, wherein the pair of structures are located respectively on a left side and on a right side of the lane as modeled by the lane model.

11. The method according to claim 4, wherein, in the step c), each one of the tangent lines is respectively fully defined by only an x-value of the selected point on the respective candidate structure in the x-direction, and a slope value defining the orientation of the respective tangent line, and without a y-value defining a lateral distance transversely to the x-direction, for selecting the pair of structures of which the respective tangent lines are parallel to one another, to be used further in the steps d) and e).

12. The method according to claim 4, wherein the orientation of the tangent lines is a slope value of the tangent lines, and wherein the updating of the far range lane model in the step e) comprises determining a function f(x) of which a first derivative at a point at the first distance in the x-direction is equal to the slope value of the tangent lines.

13. The method according to claim 4, further comprising comparing the updated value of the at least one lane course parameter with a current existing value of the at least one lane course parameter, identifying a transition point between successive lane model segments of the lane model when the updated value differs from the current existing value at a point at the first distance in the x-direction, and performing the updating of the far range lane model in the step e) with the updated value to produce a new lane model segment of the successive lane model segments only when the updated value differs from the current existing value.

14. A method of determining a course of a road on which a vehicle is driving, comprising steps:

a) providing a model including at least one course parameter that models the course of the road ahead of the vehicle, wherein the model includes and is partitioned into a near range model and a far range model;

b) with a sensor system of the vehicle, acquiring sensor data regarding surroundings ahead of the vehicle, wherein the sensor data includes and is partitioned into near range sensor data regarding a near range of the surroundings ahead of the vehicle and far range sensor data regarding a far range of the surroundings ahead of the vehicle, wherein the far range is located farther ahead of the vehicle than the near range;

c) evaluating at least the far range sensor data, comprising:
   detecting, from the far range sensor data, plural candidate structures in the far range of the surroundings ahead of the vehicle,
   for each respective one of the candidate structures, determining a respective tangent line that is a straight line tangent to the respective candidate structure at a selected point thereon, and
   among the plural candidate structures, selecting a pair of structures of which the respective tangent lines are parallel to one another;

d) determining an orientation of the tangent lines of the pair of structures;

e) adopting the determined orientation of the tangent lines of the pair of structures as a predicted orientation of the course of the road in the far range at a road point at a first distance ahead of the vehicle determined from the selected points on the pair of structures;

f) determining a respective updated value of the at least one course parameter and updating the far range model with the respective updated value only for the far range based on the predicted orientation of the course of the road in the far range at the road point at the first distance ahead of the vehicle;

g) evaluating only the near range sensor data to determine therefrom actual detected parameters including a lane width of a driving lane on the road, a lateral deviation of the vehicle from a virtual lane center line of the driving lane on the road, and a yaw angle of the vehicle in the near range;

h) generating and updating the near range model based only on the actual detected parameters for the near range; and i) using the model with the respective updated value of the at least one course parameter to predictively determine the course of the road, and operating a driver assistance system of the vehicle dependent thereon and in response thereto, to assist in a driving operation of the vehicle.

15. The method according to claim 14, further comprising determining a predicted location of the course of the road at the road point at the first distance ahead of the vehicle as falling between the selected points on the pair of structures.

16. The method according to claim 14, wherein the first distance ahead of the vehicle, for the road point at which the predicted orientation of the course of the road pertains, is defined in an x-direction ahead of the vehicle by an x-value of the selected point of at least one of the pair of structures.

17. The method according to claim 14, further comprising repeating the selecting in the step c) to successively select a plurality of the pairs of structures respectively at different distances ahead of the vehicle, and repeating the steps d), e) and f) for each respective pair of structures among the plurality of pairs of structures to update the far range model with the respective updated values at respective ones of the road points at respective values of the first distances ahead of the vehicle.

18. The method according to claim 14, wherein the pair of structures includes at least one physical structure that extends above a level of the road and that is detectable by radar sensors and/or lidar sensors of the sensor system of the vehicle.

19. The method according to claim 14, wherein the pair of structures are located off of the road respectively on a left side and a right side of the road.

20. A method of operating a vehicle that is driving along a driving lane, comprising steps:
  a) providing a lane model, which includes a model function that models the course of the driving lane, wherein the lane model includes and is partitioned into a near range lane model and a far range lane model;
  b) with sensors of the vehicle, acquiring sensor data regarding surroundings ahead of the vehicle, wherein the sensor data includes and is partitioned into near range sensor data regarding a near range of the surroundings ahead of the vehicle and far range sensor data regarding a far range of the surroundings ahead of the vehicle, and wherein the far range is located farther ahead of the vehicle than the near range, and in the far range sensor data detecting pertinent elongated structures of structure types that extend longitudinally along a roadway;
  c) for each respective one of the pertinent elongated structures, determining a respective tangent line that is a straight line tangent to the respective pertinent elongated structure at a selected point thereon, and determining a respective slope value of each respective tangent line in a ground plane of the lane model;
  d) determining an updated model function only for the far range lane model based on the respective slope values of the tangent lines of the pertinent elongated structures in the far range, such that respective first derivatives of the updated model function at respective x-values in the ground plane are respectively equal to the respective slope values;
  e) evaluating only the near range sensor data to determine therefrom actual detected parameters for the near range including a lane width of the driving lane, a lateral deviation of the vehicle from a virtual center line of the driving lane, and a yaw angle of the vehicle in the near range;
  f) generating and updating the near range lane model based only on the actual detected parameters for the near range; and
  g) using the lane model with the updated model function to predictively determine the course of the driving lane, and operating a driver assistance system of the vehicle dependent thereon and responsive thereto, to assist in a driving operation of the vehicle.

21. The method according to claim 20, wherein the pertinent elongated structures comprise physical structures selected from the group consisting of curbstones, crash barriers, roadside physical structures located laterally off to a side of a road that includes the driving lane, and roadway verges.

22. The method according to claim 20, wherein the sensors comprise at least one radar sensor or lidar sensor, and wherein the pertinent elongated structures comprise physical structures that have a structural height dimension relative to the ground plane and that can be detected by the at least one radar sensor or lidar sensor.

23. The method according to claim 20, wherein the respective x-values for the respective first derivatives of the updated model function are respectively determined from respective x-positions of the selected points on the pertinent elongated structures at which the respective tangent lines were determined.

24. The method according to claim 23, wherein the respective x-values for the respective first derivatives of the updated model function are respectively equal to the respective x-positions of the selected points on the pertinent elongated structures at which the respective tangent lines were determined.

* * * * *